United States Patent [19]
Ernst

[11] Patent Number: 5,185,735
[45] Date of Patent: Feb. 9, 1993

[54] LAN NOISE MONITOR

[75] Inventor: Stephen Ernst, Colorado Springs, Colo.

[73] Assignee: Hewlett Packard Company, Palo Alto, Calif.

[21] Appl. No.: 727,693

[22] Filed: Jul. 10, 1991

[51] Int. Cl.$^5$ ............ G06F 3/00; H04J 1/16; H04J 3/14
[52] U.S. Cl. ............ 370/13; 340/660; 340/662; 340/825.16; 340/825.17; 324/628; 324/133; 324/542
[58] Field of Search ........ 370/17, 13; 340/660, 340/661, 662, 825.06, 825.17, 825.59, 825.77, 825.16; 324/524, 542, 539, 543, 628, 133

[56] References Cited
U.S. PATENT DOCUMENTS 3,341,816 9/1967 Davis .................. 340/662
4,916,570 4/1990 Dale .................... 340/661

FOREIGN PATENT DOCUMENTS

56-4957 1/1981 Japan .................. 370/17

Primary Examiner—Kenneth A. Wieder
Assistant Examiner—Jose M. Solis
Attorney, Agent, or Firm—Guy J. Kelley

[57] ABSTRACT

An apparatus and method for monitoring voltage on a LAN cable on which data is conveyed by negative-going pulses. Positive voltage on the LAN cable is interpreted as noise. Positive voltage is detected by, for example, comparing the voltage on the LAN cable to a positive reference voltage, determining the peak positive voltage on the LAN cable, or determining the average positive voltage on the LAN cable. Upon the detection of positive voltage on the LAN cable, the presence (and possibly the amount) of noise is indicated to a person or data processing system which supervises the LAN called a LAN sentinel. The apparatus or method could be implemented in a Media Attachment Unit (MAU) with audio, visual or electronic noise indication means. Alternatively, it could be implemented as a hand-held diagnostic tool.

20 Claims, 11 Drawing Sheets

FIG 10

LAN NOISE MONITOR

BACKGROUND OF THE INVENTION

1. Field of the Invention

The present invention relates generally to an apparatus and method for detecting problems with local area network (LAN) hardware. More particularly, the present invention relates to an apparatus and method for detecting noise on a LAN cable.

2. Related Art

A standard local area network (LAN) comprises a plurality of nodes connected to one another through a coaxial cable (called a LAN cable). The nodes communicate by sending packets of binary signals to one another. The binary signals comprise transitions between 0 and −2 volts.

A packet comprises a preamble, an address and the data to be communicated. The preamble is a sequence of −2 volt pulses to identify the beginning of the packet. The address is a number identifying the node to which the packet is being sent. The data is all or a portion of a information to be communicated between two nodes, for example.

The LAN cable can only convey one packet at a time. Therefore, before sending a packet, a node must determine that there are no packets currently being transmitted over the LAN cable. A node will make such a determination if the average voltage level on the LAN cable (called the DC bias) is lower than a particular voltage level (called the signal detect level). The signal detect level could be, for example, −0.3 volts.

The determination is based on the following. During transmission of the preamble, the sequence of −2 volt pulses brings the DC bias down to approximately one-half the peak voltage (−1 volt). Because this voltage is below the signal detect level, a node would detect a packet on the LAN cable.

During the transmission of addresses and data, the voltage on the LAN cable is likewise below the signal detect level. The binary representation of addresses and data is encoded so that there is a limited amount of time between transitions of 0 and −2 volts. The limited amount of time is too short for the DC bias to rise much above −1 volt.

Figure 1A:
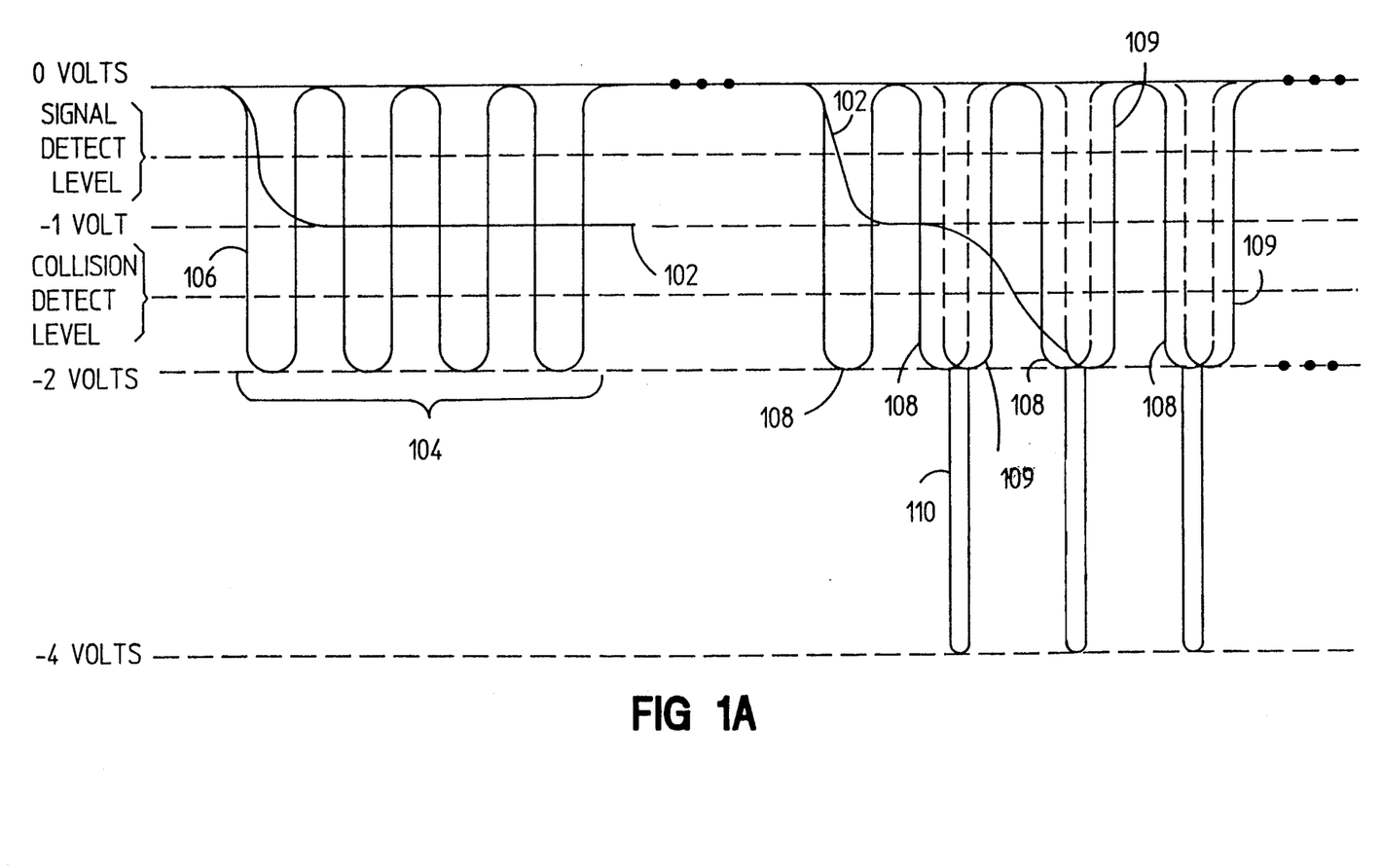
FIG. 1A shows a timing diagram of the DC bias of a LAN cable during the first few pulses of a preamble and during the first few pulses of two overlapping preambles.

FIG. 1A shows the level of a DC bias 102 during the first several pulses of a first preamble 104. The sequence of −2 volt pulses brings the DC bias 102 down to −1 volt. Because this is below the signal detect level, other nodes on the LAN are capable of determining that there is a packet being transmitted over the LAN cable. Therefore, generally, no other node will send a packet.

Occasionally, however, a node will send a packet while there is another packet on the LAN cable, causing what is called a collision. A collision occurs when two nodes send packets approximately simultaneously. To appropriately handle collisions, a node must continue to monitor the DC bias while it is transmitting. A node determines that a collision has occurred if the DC bias drops below a particular voltage level called the collision detect level. The latter is approximately −1.3 volts.

The determination is based on the following. If two nodes are simultaneously transmitting, they will bring the DC bias 102 to approximately twice what it would be if only one node were transmitting. Therefore, during a collision, the DC bias 102 is approximately −2 volts, which is below the collision detect level.

Upon detecting a collision, transmitting nodes continue to transmit for a short period of time to enable other nodes to detect the collision. Subsequently, all nodes temporarily cease transmitting.

FIG. 1A shows the level of the DC bias 102 during the first several pulses of second and third preambles 108 and 109 which collide. Looking at FIG. 1A, the second preamble 108 initially brings the DC bias 102 below the signal detect level. Shortly after the beginning of the second preamble 108, the third preamble 109 begins. The −2 volt pulses of the second preamble 108 overlap the −2 volt pulses of the third preamble 109 (as shown at 110), pulling the peak voltage to −4 volts. The overlapping preambles 110 bring the DC bias 102 down to one-half the peak voltage (−2 volts). This level is below the collision detect level, and a collision is therefore detected.

In FIG. 1A, the pulses of the second and third preambles 108 and 109 are approximately 90 degrees out of phase. Note that overlapping preambles would bring the DC bias 102 below the collision detect level regardless of how they overlapped. For example, if the pulses were 180 degrees out of phase, they would combine to place a steady −2 volt signal on the LAN cable and thereby bring the DC bias 102 to −2 volts. Alternatively, if the pulses were in phase with one another, they would combine to produce a square wave with a −4 volt peak. Again, the DC bias 102 would be −2 volts.

Noise on a LAN cable can substantially interfere with the transmission of packets. The most common source of noise on a LAN cable is commercial power resulting from two or more grounds on the LAN cable. A ground can be caused by, for example, an improperly insulated LAN cable or a faulty media attachment unit (MAU).

Figure 1B:
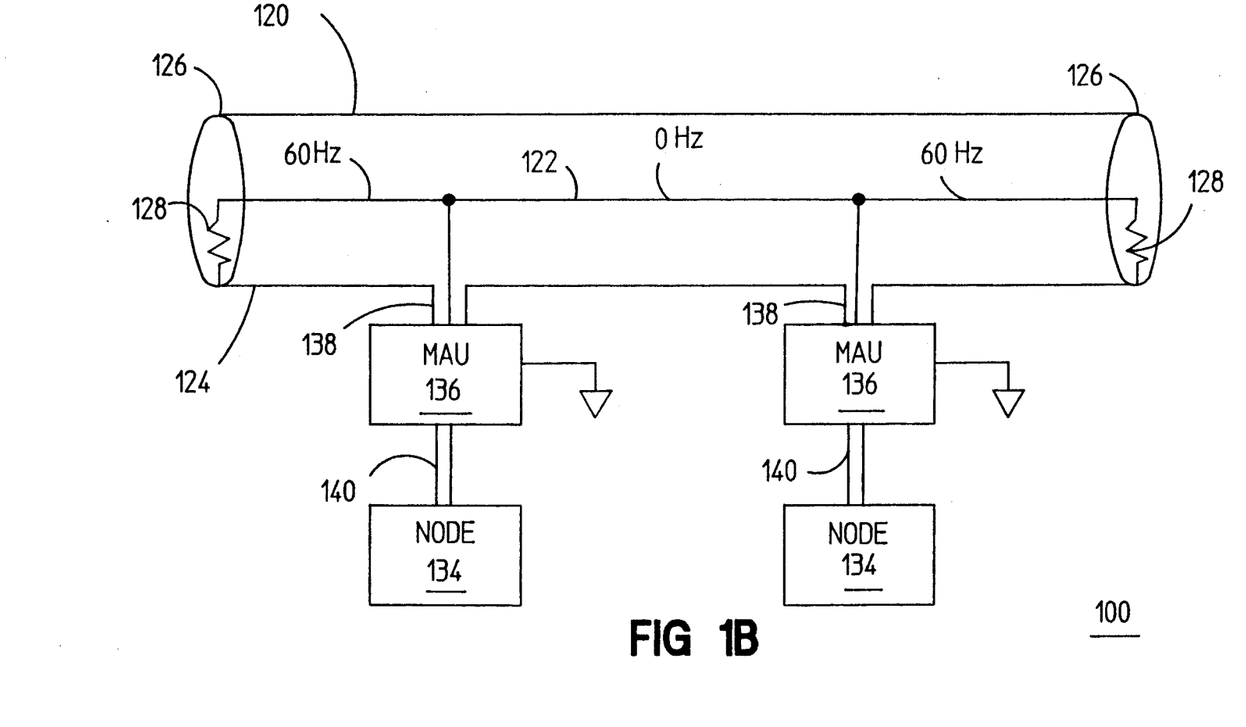
FIG. 1B shows a LAN cable which is grounded in two places by faulty MAUs and thereby transmits commercial power.

FIG. 1B shows a LAN 100 having a LAN cable 120 which is grounded in two places to thereby transmit commercial power. The LAN cable 120 comprises an center conductor 122 and an outer conductor 124. At each LAN cable end 126, the center conductor 122 is electrically connected to the outer conductor 124 through a 25 ohm resistor 128.

Each of two nodes 134 is attached to the LAN cable 120 through a faulty MAU 136. (The faults of the MAUs are depicted as ground connections off the MAUs.) Each MAU 136 is electrically connected to the LAN cable 120 through a "T" connection 138. Each MAU 136 is electrically connected to one of the nodes 134 through an Attachment Unit Interface (AUI) cable 140.

There is no noise on the portion of the LAN cable 120 between the MAUs 136. However, there is noise at 60 Hz on the portion of the LAN cable 120 between each MAU 136 and the nearest cable end 128.

Figure 2:
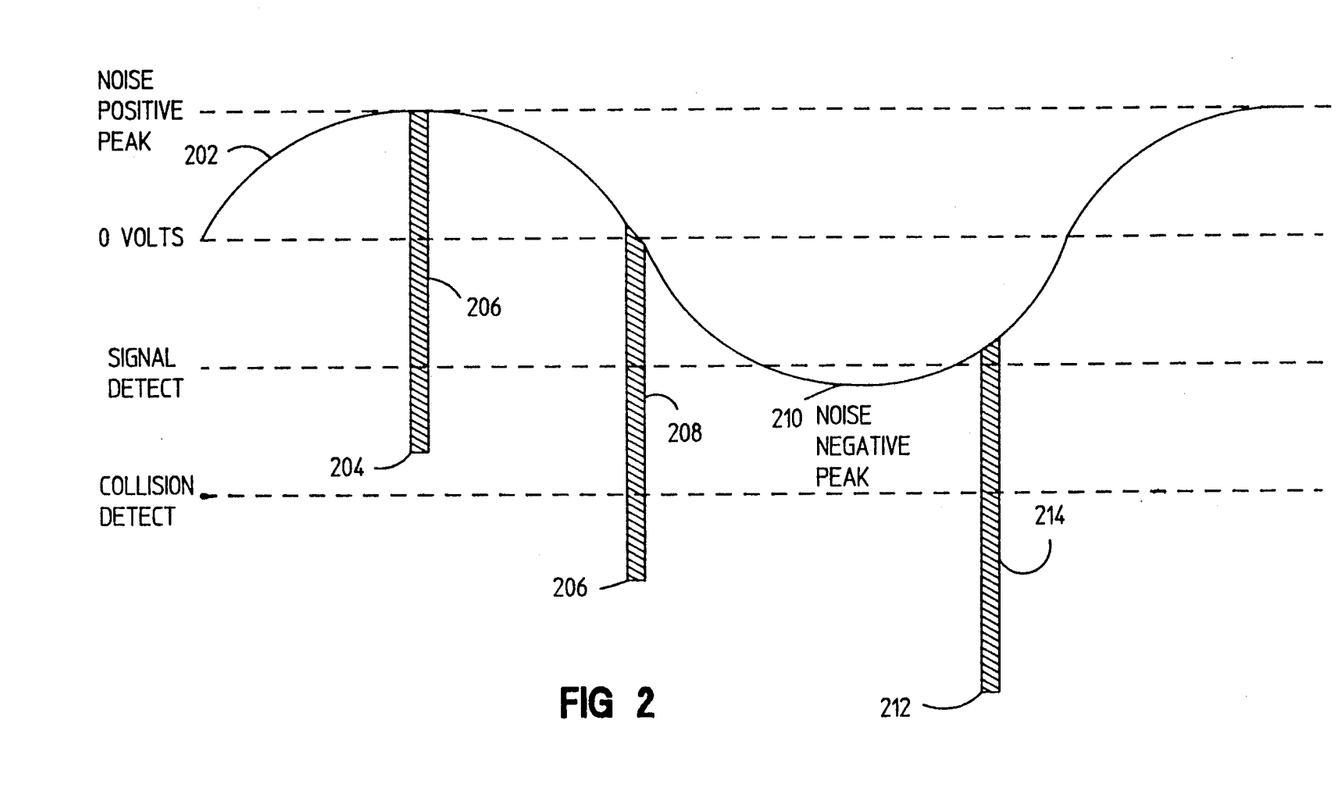
FIG. 2 shows a timing diagram of packets being transmitted on a LAN cable with noise from a source of commercial power.

FIG. 2 shows how noise from a commercial power source can interfere with data transmissions on the LAN 100 of FIG. 1B. A noise curve 202 represents noise from a commercial power source. The noise interferes with packet transmission because the DC bias is relative to the noise level. When a first packet 204 is sent, the noise curve 202 is at a noise positive peak. The DC bias 206 during transmission of the first packet 204 is above the signal detect level. As a result, the first packet 204 is not detected.

When a second packet 206 is sent, the noise curve 202 is at approximately 0 volts. The DC bias 208 during the second packet 206 is approximately −1 volt, which is between the signal detect level and the collision detect level. The second packet 206 therefore transmits normally.

During the time when the noise curve 202 is close to a noise negative peak, the noise curve 202, and thus the DC bias 210, are below the signal detect level. The nodes 134 interpret the noise as a packet and cease transmitting until the noise curve rises above the signal detect level.

When a third packet 212 is sent, the noise curve 202 is slightly above the signal detect level. The DC bias 214 during transmission of the third packet 212 falls below the collision detect level. The third packet 212 is therefore interpreted as a collision.

The problem of LAN noise from a source of commercial power is generally addressed by detecting its presence, locating its origin and eliminating it. Several well-known approaches are used to detect LAN noise. One such approach is by measuring the total power on the LAN cable 120. Because signals as well as noise generate power, this approach can only be used when no nodes 134 are transmitting. Accordingly, all nodes 134 must be turned off before the measurement is taken. Doing so would be undesirable on a busy network.

A second approach for detecting LAN noise would be to check for shorts to ground using an ohmmeter. But detection of a ground does not necessarily indicate the presence of LAN noise because LAN noise only occurs when the LAN cable 120 is grounded in more than one place.

A third approach is to search for certain collision patterns indicative of LAN noise. This is often impractical because such patterns are topologically dependent. Much domain-specific information is therefore required to detect them.

A fourth approach is to examine a LAN cable 120 with an oscilloscope. This approach is often impractical because of the high level of expertise required by the oscilloscope operator in order to distinguish noise from data. Also, oscilloscopes generally ground the LAN cable 120 during measurement. Thus, an oscilloscope would not be effective on a LAN cable 120 which was grounded exactly once. Furthermore, the limited portability of oscilloscopes makes the fourth approach difficult to physically carry out.

Therefore, what is needed is an easy to use apparatus or method for detecting LAN noise which requires neither disruption of the LAN nor substantial operator expertise.

SUMMARY OF THE INVENTION

Accordingly, the present invention is directed towards an apparatus and method for monitoring voltage on a LAN cable on which data is conveyed by negative-going pulses. The apparatus and method of the present invention, called a LAN noise monitor, interprets any positive voltage on the LAN cable as noise.

The LAN noise monitor of the present invention detects positive voltage on the LAN cable by, for example, comparing the voltage on the LAN cable to a positive referential voltage, determining the peak positive voltage on the LAN cable, or determining the average positive voltage on the LAN cable. Upon detecting positive voltage on the LAN cable, the LAN noise monitor indicates the presence (and possibly the amount) of noise to a LAN sentinel. The LAN sentinel could be, for example, a person or data processing system which supervises the LAN.

Because the LAN noise monitor interprets positive voltage as noise and because data is conveyed on the LAN cable by negative-going pulses, it operates without disrupting the LAN.

The LAN noise monitor could be implemented in a Media Attachment Unit (MAU) with means to audibly visually or electronically indicate the presence or amount of noise. Alternatively, it could be implemented as a hand-held diagnostic tool. Either implementation would be easy to use and would not require operator expertise.

BRIEF DESCRIPTION OF THE DRAWINGS

The present invention will be more fully understood with reference to the accompanying drawings in which.

DETAILED DESCRIPTION OF THE PREFERRED EMBODIMENTS

The present invention, called a LAN noise monitor, is based on the principle that positive voltage on the LAN cable 120 is generally noise, and that commercial power, the predominant source of noise, has a positive voltage component. Accordingly, the LAN noise monitor of the present invention is directed towards an apparatus and method for monitoring the voltage level on the LAN cable 120, and indicating its presence to a LAN sentinel. The LAN sentinel could be, for example, a person or data processing system which supervises the LAN.

Note that although positive voltage on the LAN cable 120 is generally noise, it could also result when the center conductor 122 is shorted to the outer conductor 124. This situation is easy to distinguish from when the LAN cable 120 is shorted to ground, however. When there is a short from the center conductor 122 to the outer conductor 124, all data transmission ceases because the DC bias goes to 0 volts. Also, there is no resistance between the center conductor 122 and the outer conductor 124.

Figure 3:
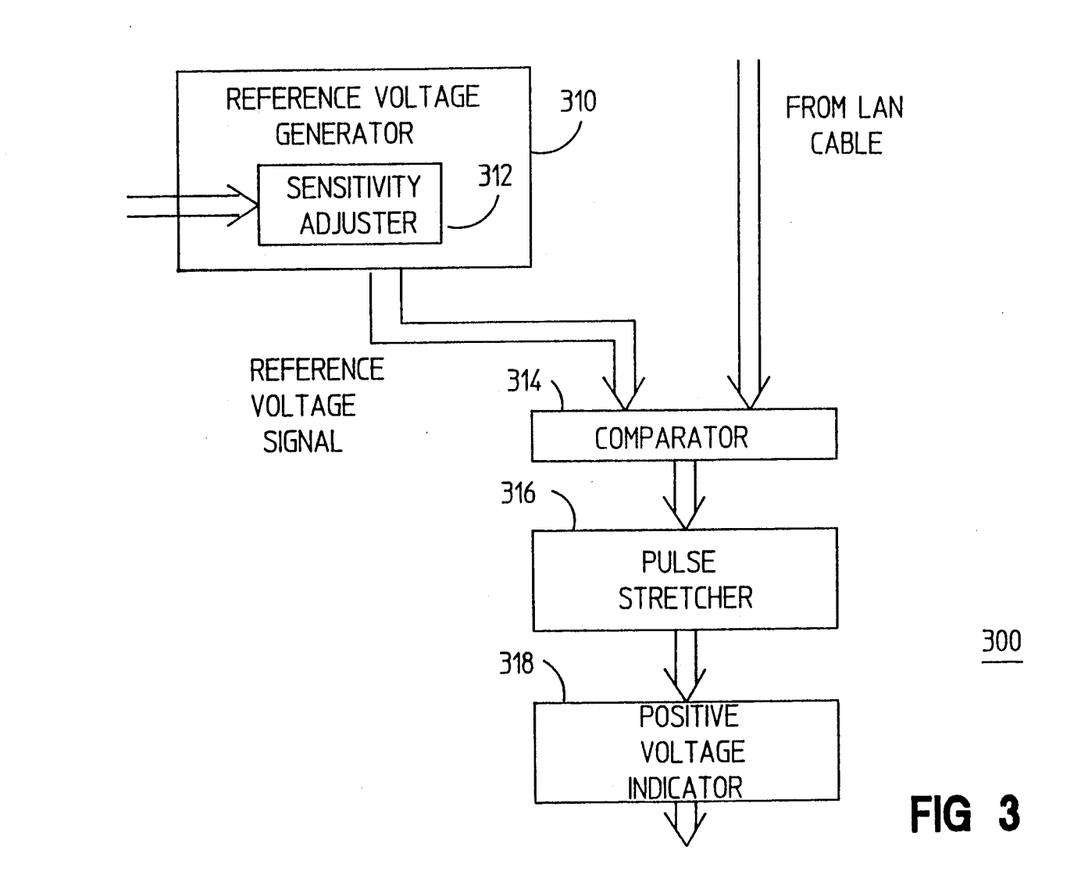
FIG. 3 shows a block diagram of a comparator LAN noise monitor.

A first embodiment of the present invention is a comparator LAN noise monitor 300. FIG. 3 shows a block diagram of an implementation of the comparator LAN noise monitor 300. Other ways to implement the comparator LAN noise monitor 300 would be obvious to one of ordinary skill in the art.

The comparator LAN noise monitor 300 generates an indication to the LAN sentinel when the voltage level on the LAN cable 120 has exceeded a specified reference voltage. The comparator LAN noise monitor 300 comprises a reference voltage generator 310, a sensitivity adjuster 312, a comparator 314, a pulse stretcher 316 and a positive voltage indicator 318.

The reference voltage generator 310 generates a signal having a specified voltage level. The generator 310 could comprise, for example, a voltage source such as a battery and a simple voltage divider. The sensitivity adjustor 312 is incorporated in the reference voltage generator 310 to permit the LAN sentinel to vary the reference voltage. The sensitivity adjuster 312 could comprise, for example, a potentiometer.

The comparator 314 receives as input the signal from the reference voltage generator 310 and a signal from the LAN cable 120. The comparator generates a first digital signal (for example, 0 volts) when the voltage level of the signal from the reference voltage generator 310 exceeds that of the signal from the LAN cable 120, and a second digital signal (for example, 5 volts) otherwise.

The pulse stretcher 316 receives as input the signal generated by the comparator 314. The pulse stretcher 316 generates a low voltage signal until the output of the comparator 314 goes high. The pulse stretcher 316 generates a high voltage signal for at least the duration of a cycle of commercial power after detecting the second digital signal from the comparator 314.

The comparator 314 could be an LM3111 comparator. The pulse stretcher 316 could comprise off-the-shelf components which are well known to those of ordinary skill in the art.

Figure 9:
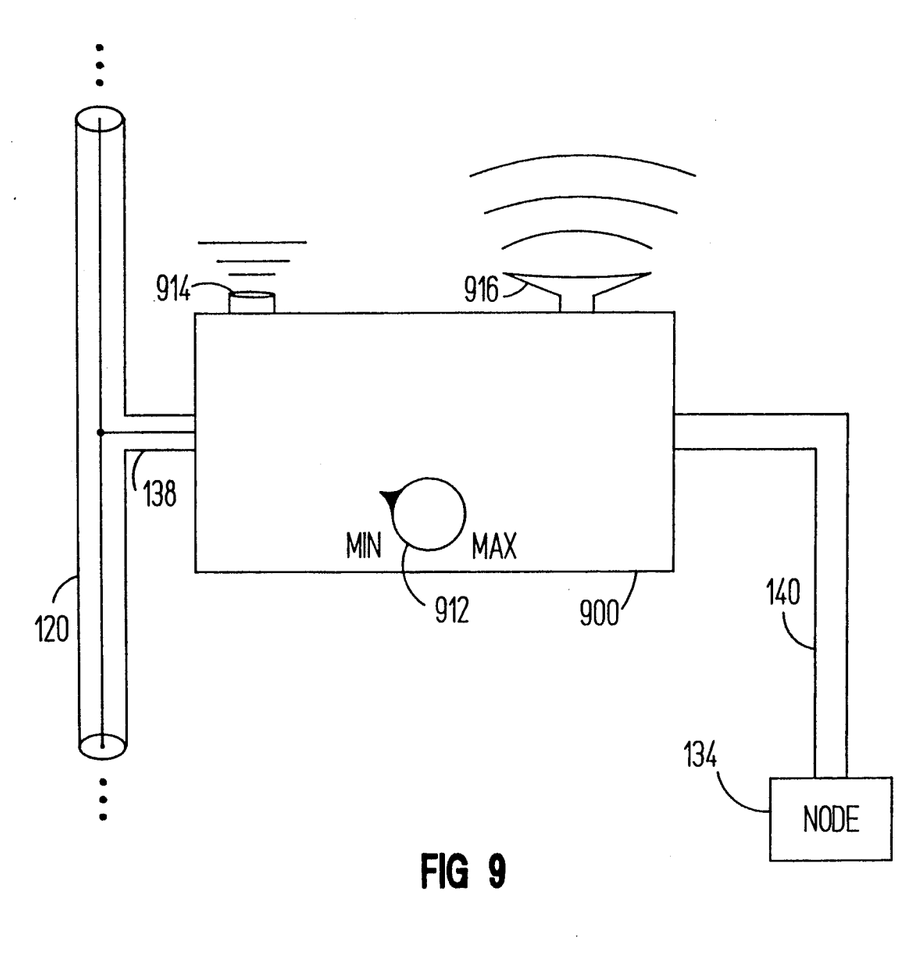
FIG. 9 shows a block diagram of a LAN noise monitor as implemented in a MAU.

The positive voltage indicator 318 receives input from the pulse stretcher 316. It could comprise an operational amplifier (op amp) such as an LM358. It provides an audible, visual or electrical indication to the LAN sentinel when it receives a high voltage signal from the pulse stretcher 316. For example, as shown in FIG. 9, the positive voltage indicator 318 could indicate by lighting a LED 914 or generating a tone which is audible via a speaker 916.

Figure 4A:
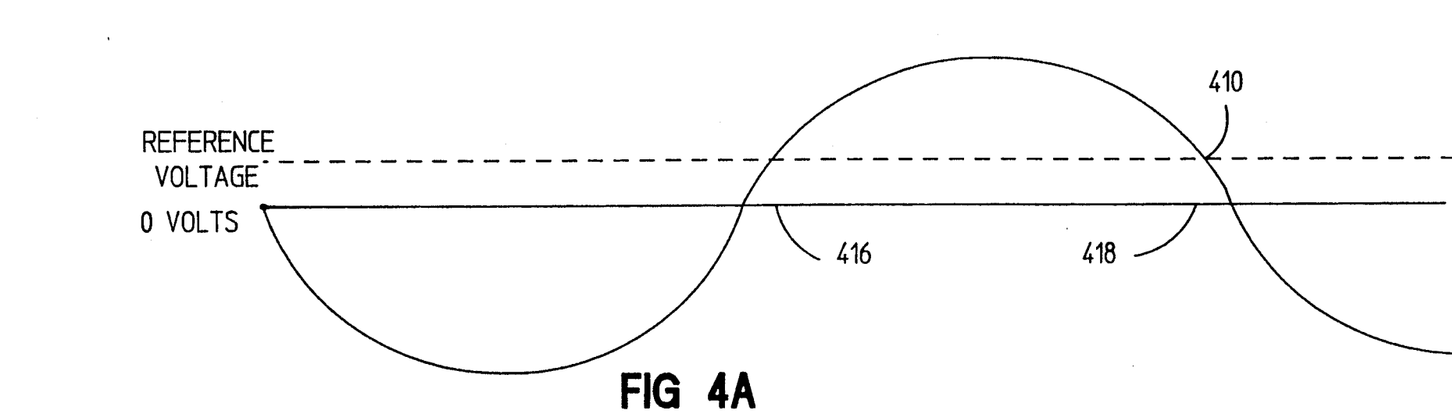
FIG. 4A shows a timing diagram of the DC bias on a LAN cable with noise from a source of commercial power.
Figure 4B:
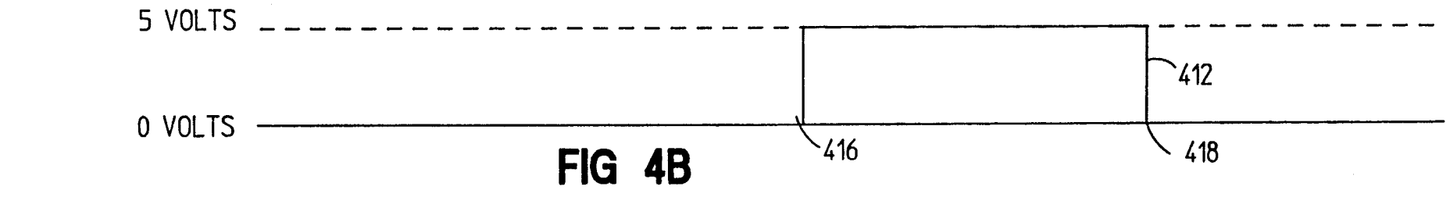
FIG. 4B shows a timing diagram of the output voltage of a comparator of the comparator LAN noise monitor of FIG. 3 when monitoring the voltage on the LAN cable of FIG. 4A.
Figure 4C:
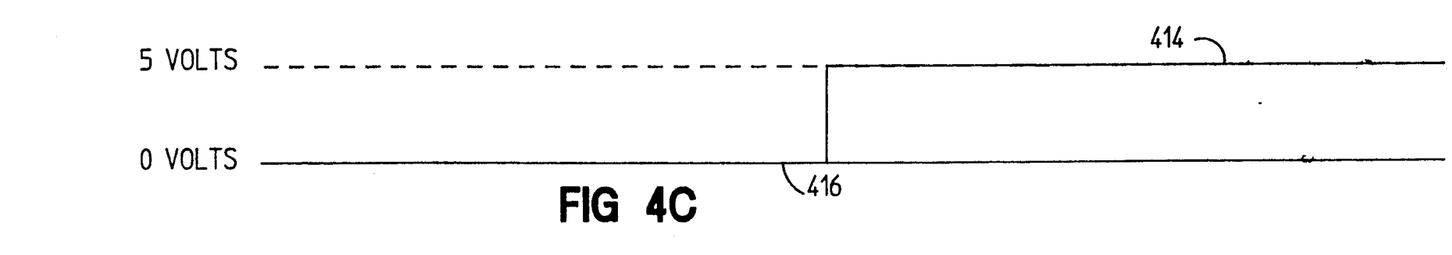
FIG. 4C shows a timing diagram of the output voltage of a pulse stretcher of the comparator LAN noise monitor of FIG. 3 when monitoring the voltage on the LAN cable of FIG. 4A.

FIGS. 4A, 4B and 4C show timing diagrams which illustrate the operation of the comparator LAN noise monitor 300 when there is noise from a commercial power source on the LAN cable 120. FIG. 4A shows a LAN cable voltage 410; FIG. 4B shows a comparator output voltage 412 (the output of the comparator 314); and FIG. 4C shows a pulse stretcher output voltage 414 (the output of the pulse stretcher 316).

Looking at FIGS. 4A, 4B and 4C, the cable voltage 410 rises above the reference voltage at a time 416. Immediately thereafter, the comparator 314 switches from generating the first digital signal to the second digital signal. Correspondingly, the comparator output voltage 412 switches from a low voltage such as 0 volts to a high voltage such as 5 volts. Immediately after the transition of the comparator output voltage 412, the output of the pulse stretcher 316 switches from the low voltage volts to the high voltage.

At a time 418, the cable voltage 410 falls below the reference voltage. Immediately thereafter, the comparator 314, and, correspondingly, the comparator output voltage 412, switches from the high voltage to the low voltage. The level of the pulse stretcher output voltage 414, however, remains at 5 volts.

Figure 5:
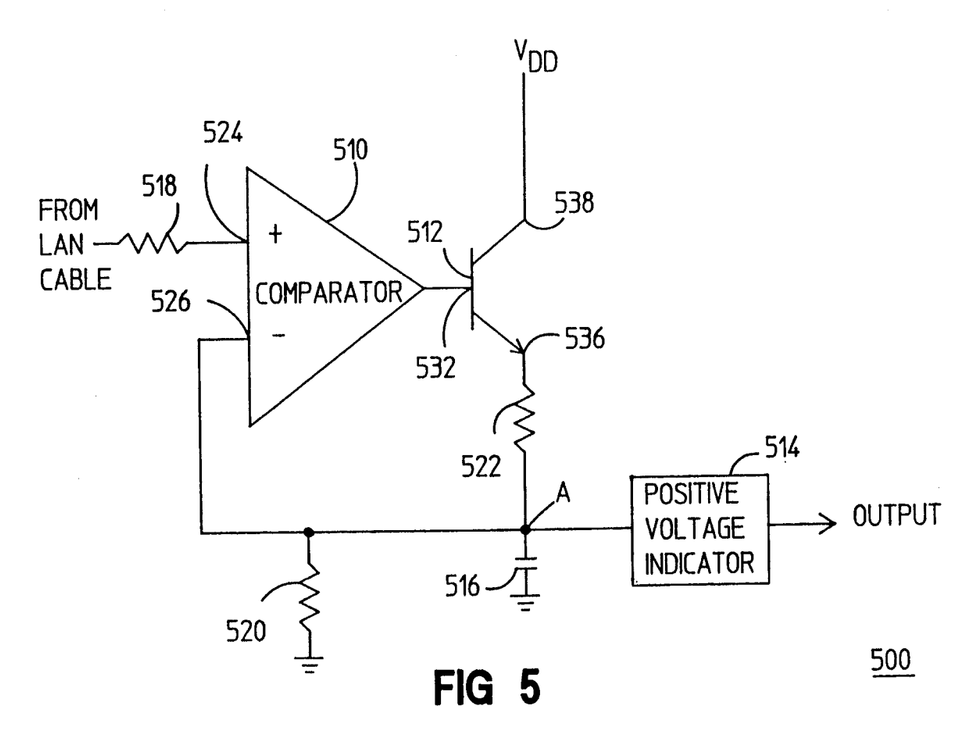
FIG. 5 shows a block diagram of a peak detecting lan noise monitor.

A second embodiment of the present invention is a peak detecting LAN noise monitor 500. FIG. 5 shows a circuit diagram of an implementation of the peak detecting LAN noise monitor 500. Other ways to implement the peak detecting LAN noise monitor 500 would be obvious to one of ordinary skill in the art.

The peak detecting LAN noise monitor 500 generates an output signal which indicates the positive peak level detected on an input signal from the LAN cable 120. The peak detecting LAN noise monitor 500 comprises a comparator 510; a NPN transistor 512; a capacitor 516; first, second and third resistors 518, 520, 522, respectively; and the positive voltage indicator 318 of FIG. 3.

The peak detecting LAN noise monitor 500 could comprise off-the-shelf components such as an LM3111 comparator, a 2N3904 NPN transistor and a LM358 op amp.

A non-inverting input 524 of the comparator 510 is electrically connected to the LAN cable 120 through the first resistor 518.

A first end of the capacitor 516 is electrically connected to an inverting input 526 of the comparator 510. The first end of the capacitor 516 is also connected to ground through the second resistor 520; to an emitter 536 of the NPN transistor 512 through the third resistor 522; and to the input of the positive voltage indicator 318. The second end of the capacitor 516 is electrically connected to ground.

A base 532 of the NPN transistor 512 is electrically connected to the output of the comparator 510. A collector 538 of the NPN transistor 512 is electrically connected to a voltage source $V_{DD}$ of, for example, approximately 5 volts.

The peak detector LAN noise monitor 500 operates as follows. When the voltage level on the LAN cable 120 exceeds the voltage level at a node A (located at the first end of the capacitor 516), the comparator 510 generates a high voltage signal. The high voltage signal at the base 532 of the NPN transistor 512 causes the voltage source to charge the capacitor 516.

Once the voltage of the capacitor 516 reaches the level of the LAN cable 120, the output of the comparator 510 switches to a low voltage signal, thereby tuning off the NPN transistor 512. The capacitor 516 then discharges through the second resistor 520.

The size of the capacitor 516 and the resistor 520 are selected so that the capacitor discharges slowly enough to clearly indicate the peak voltage on the LAN cable 120 to the LAN sentinel, but charges fast enough to catch peaks of relatively short duration. For example, the capacitor 516 might have a capacitance of 10 microfarads, and the second resistor 520 might have a resistance of 100 k ohms.

Figure 6A:
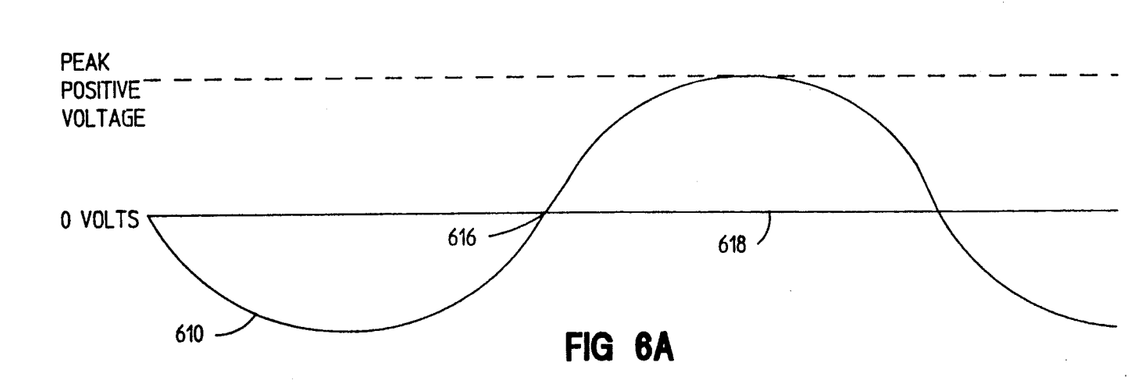
FIG. 6A shows a timing diagram of the DC bias on a LAN cable with noise from a source of commercial power.
Figure 6B:
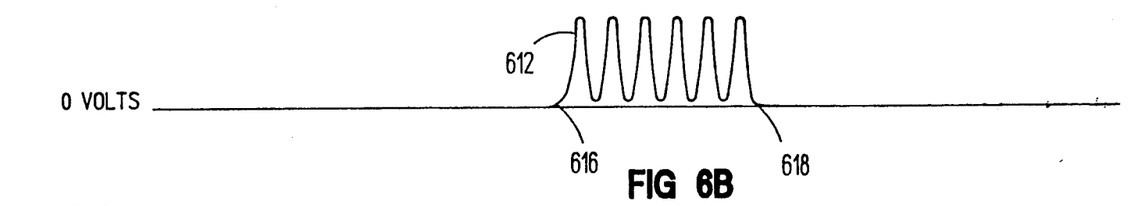
FIG. 6B shows a timing diagram of the output voltage of a comparator of the peak detecting LAN noise monitor of FIG. 5 when monitoring the voltage on the LAN cable of FIG. 6A.
Figure 6C:
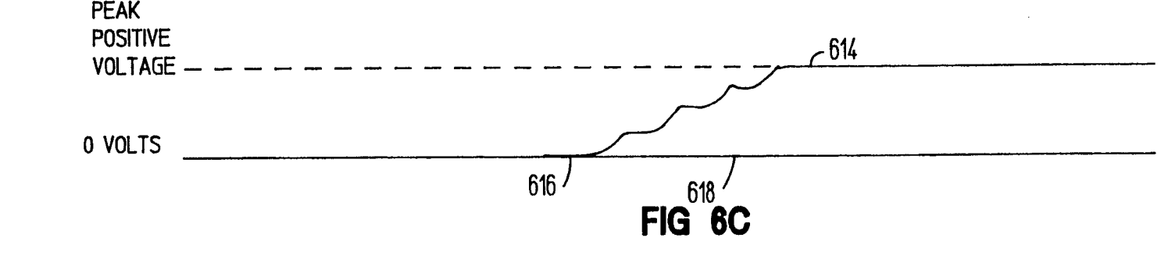
FIG. 6C shows a timing diagram of the output voltage of a node A of the peak detecting LAN noise monitor of FIG. 5 when monitoring the voltage on the LAN cable of FIG. 6A.

FIGS. 6A, 6B and 6C show timing diagrams which illustrate the operation of the peak detector LAN noise monitor 500 when there is noise from a commercial power source on the LAN cable 120. FIG. 6A shows a LAN cable voltage 610. FIG. 6B shows a comparator output voltage 612 (the output of the comparator 510). FIG. 6C shows a voltage at a node A (the voltage across the capacitor 516).

The LAN cable voltage 610 rises above 0 volts at 616 and continues to rise until 618, when it reaches a peak positive voltage. The comparator output voltage 612 then pulses high for the short period of time it takes for the voltage source to charge the capacitor 516 to the voltage level on the LAN cable 120. The comparator output voltage 612 continues to pulse high for short periods of time until the level of the LAN cable voltage 610 stops increasing at 618. Each time the comparator output voltage 612 pulse high, current flows through the NPN transistor 512, permitting the voltage source $V_{DD}$ to charge the capacitor 516. As a result, the voltage at node A increases a small amount every time the comparator output voltage 612 pulses high.

When the LAN cable voltage 610 stops increasing at 618, the capacitor voltage 614 will be at the peak positive voltage. Because the capacitor 516 discharges slowly, the voltage at node A remains at approximately the peak positive voltage for at least the duration of a cycle of the LAN cable voltage 610.

Figure 7:
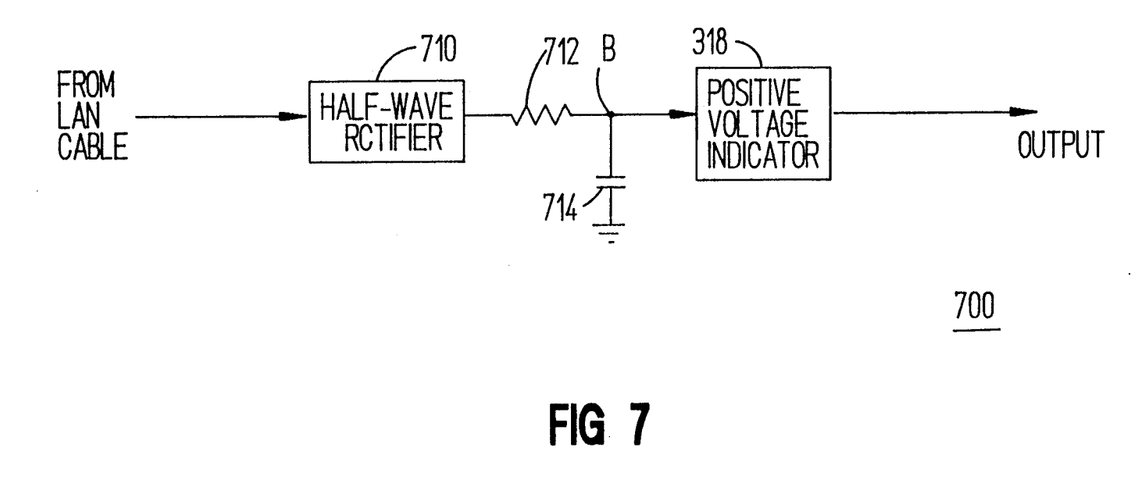
FIG. 7 shows a block diagram of an average detecting LAN noise monitor.

A third embodiment of the present invention is an average detecting LAN noise monitor 700 which generates an output signal at a level of the average positive level detected on an input signal. FIG. 7 shows a block diagram of an implementation of the average detecting LAN noise monitor 700. Other ways to implement the average detecting LAN noise monitor 500 would be obvious to one of ordinary skill in the art.

The average detecting LAN noise monitor 700 of FIG. 7 comprises a half-wave rectifier 710, a resistor 712, a capacitor 714 and the positive voltage indicator 318 of FIG. 3. The half-wave rectifier 710 could comprise off-the-shelf components, such as a LM358 op amp, which are well known to those of ordinary skill in the art.

The half-wave rectifier 710 receives input from the LAN cable 120 and provides output to a node B (located at the first end of the capacitor 714). The first end of the capacitor 714 is also electrically connected to the input of the positive voltage indicator 318. The second end of the capacitor 714 is connected to ground.

Figure 8A:
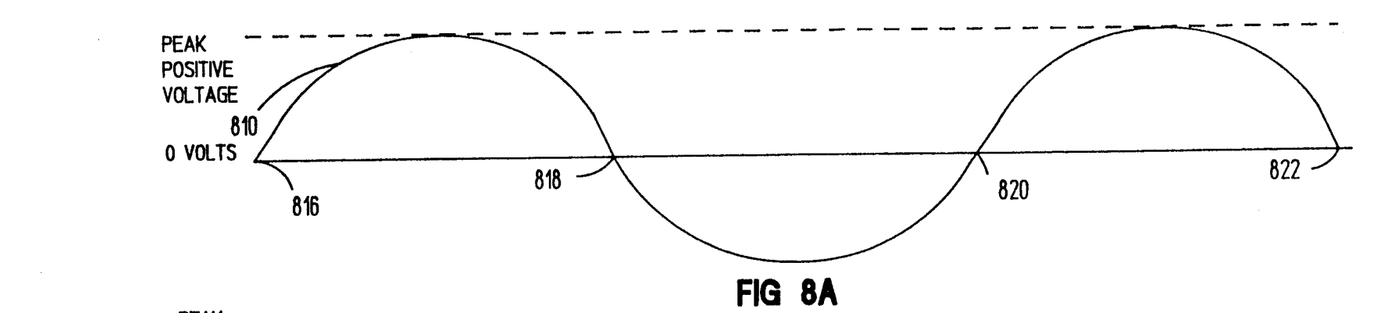
FIG. 8A shows a timing diagram of the DC bias on a LAN cable with noise from a source of commercial power.
Figure 8B:
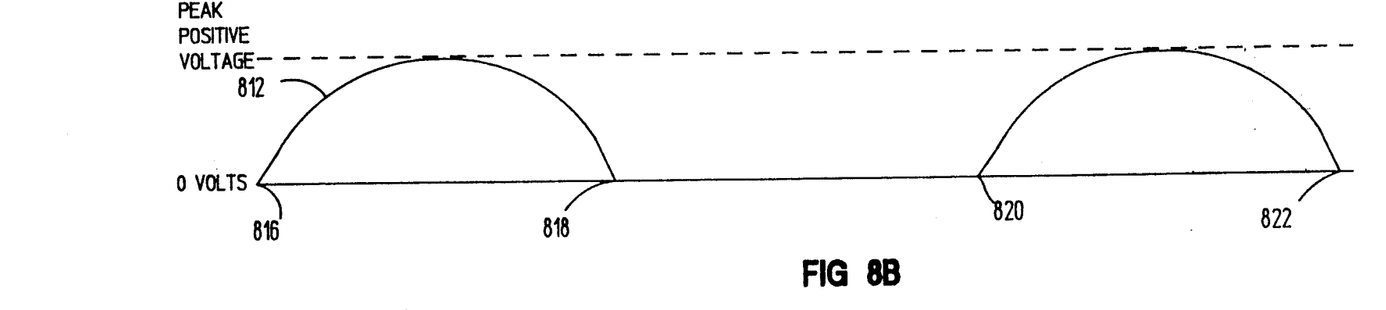
FIG. 8B shows a timing diagram of the output voltage of a half-wave rectifier of the peak detecting LAN noise monitor of FIG. 7 when monitoring the voltage on the LAN cable of FIG. 8A.
Figure 8C:
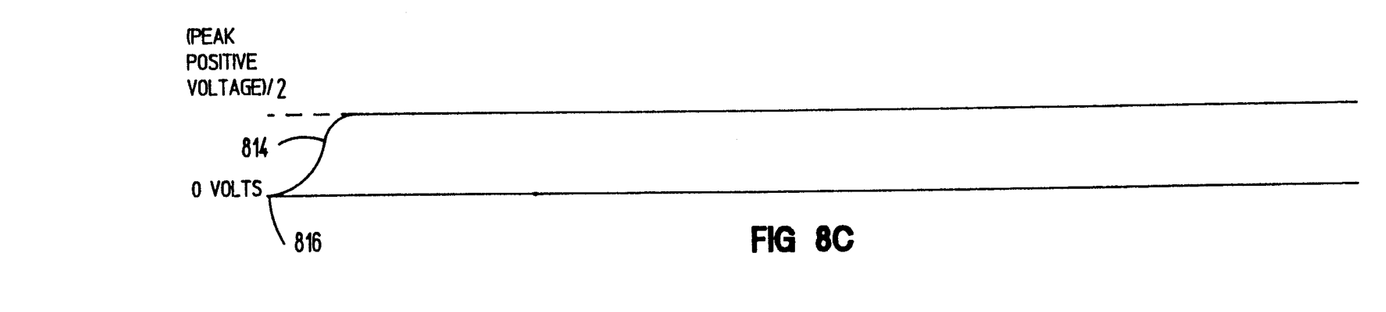
FIG. 8C shows a timing diagram of the output voltage of a node B of the peak detecting LAN noise monitor of FIG. 7 when monitoring the voltage on the LAN cable of FIG. 8A.

FIGS. 8A, 8B and 8C show timing diagrams which illustrate the operation of the average detector LAN noise monitor 700 when there is noise from a commercial power source on the LAN cable 120. FIG. 8A shows a LAN cable voltage 810; FIG. 8B shows a half-wave rectifier output voltage 812 (the output of the half-wave rectifier 710); and FIG. 8C shows a node B voltage 814 (the voltage at the node B).

The LAN cable voltage 810 is a 60 Hz sinusoidal wave (representing commercial power) which rises above 0 volts at 816, peaks at a peak positive voltage, falls below 0 volts at 818, and again rises above 0 volts at 820, peaks at the peak positive voltage, and falls below 0 volts at 822.

The half-wave rectifier output 812 follows positive voltage signals of the LAN cable output 810. Accordingly, the half-wave rectifier output 812 follows the LAN cable output from 0 volts to the peak positive voltage to 0 volts between 816 and 818, and again between 820 and 822.

The half-wave rectifier output 812 charges the capacitor 714 between 816 and 818, and again between 820 and 822 with an average voltage of half the peak positive voltage. The size of the capacitor 714 and the resistor 712 are chosen so that there is minimal discharge during the negative portion of the LAN cable voltage 810. For example, the capacitor 714 might have a capacitance of 10 microfarads, and the resistor 712 might have a resistance of 100 k ohms.

Therefore, when the half-wave rectifier rises above 0 volts at 816, the node B voltage 814 rises to (peak positive output)/2. The node B voltage 814 remains at (peak positive output)/2 for at least the duration of a cycle of the LAN cable voltage 810.

There are several useful implementations of any of the three embodiments of the LAN noise monitor described above. In a first implementation, the LAN noise monitor is incorporated into a MAU. FIG. 9 shows a MAU LAN noise monitor 900. The MAU LAN noise monitor 900 is electrically connected to the LAN cable 120 through the "T" connection 138, and to the node 134 through the AUI cable 140.

If the MAU LAN noise monitor 900 were a comparator LAN noise monitor 300, then it could have a sensitivity adjustment 912 and noise indication means such as a LED 914, a speaker 916, an electrical signal (not shown), or some combination thereof. The sensitivity adjustment 912 is a means for manipulating the sensitivity adjuster 312 of FIG. 3. It could be, for example, a knob connected to a potentiometer operating a voltage or current divider. The alarm 318 would light the LED 914, activate the speaker 916 or initiate the electrical signal when the comparator LAN noise monitor 300 detected voltage on the LAN cable 120 in excess of the reference voltage.

If the MAU LAN noise monitor 900 were a peak detector LAN noise monitor 500 or an average detector LAN noise monitor 700, it could have a more precise indicator of the voltage on the LAN cable 120 such as a bar graph of LEDs or an analog meter (not shown). Also, in such an implementation the MAU LAN noise monitor 900 would not have a sensitivity adjustment 912.

Figure 10:
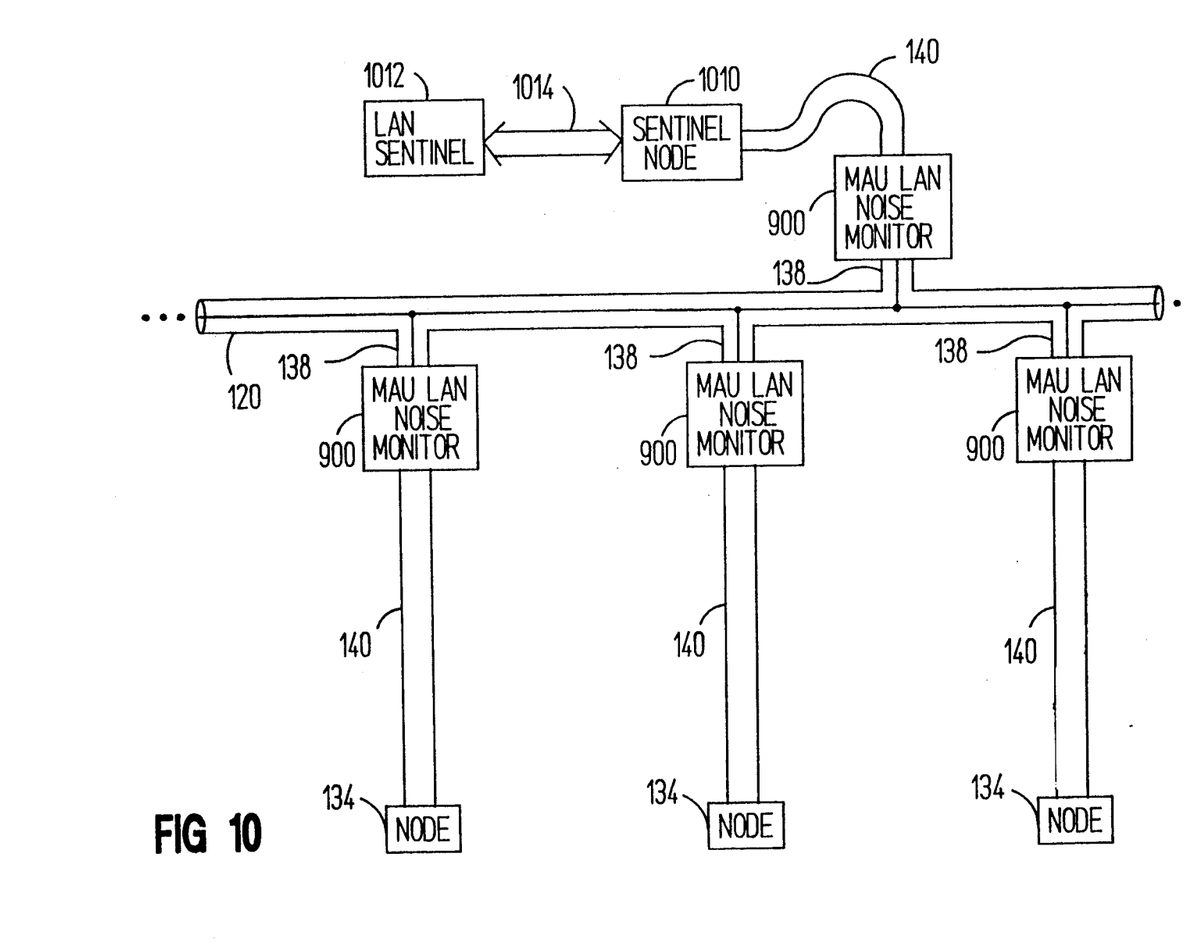
FIG. 10 shows a block diagram of a LAN having a plurality of the LAN noise monitors of FIG. 9 providing input to a sentinel node.

The LAN sentinel could more easily determine the presence and approximate location of LAN noise if it could simultaneously monitor noise throughout the LAN 100. FIG. 10 shows a block diagram of a LAN which enables the LAN sentinel to do so. Looking at FIG. 10, a number of nodes 134 are electrically connected to the LAN cable 120 through MAU LAN noise monitors 900. The MAU LAN noise monitors 900 could indicate any noise they detected by sending electrical signals over the LAN cable 120. A sentinel node 1010, which is also electrically connected to the LAN cable 120 through a MAU LAN noise monitor 900, could monitor such signals. A LAN sentinel 1012 communicates the sentinel node 1010 through a path 1014.

If the LAN sentinel 1012 were a person, an implementation of the LAN noise monitor in a highly portable diagnostic tool would be desirable. A hand-held LAN noise monitor (not shown) would be most useful as a peak detector LAN noise monitor 500 or an average detector LAN noise monitor 700. The hand-held LAN noise monitor would have a visual indicator of voltage such as a bar graph of LEDs or an analog meter. To increase portability, it would likely be powered by batteries.

A human LAN sentinel 1012 could use the hand-held LAN noise monitor to detect the level of noise at various points on the LAN cable 120. He or she would do so by electrically connecting the apparatus to the LAN cable 120 and reading the visual indicator.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for monitoring voltage on a LAN cable on which data is conveyed by negative-going pulses, comprising:
   (a) a positive voltage detector electrically connected to the LAN cable, for detecting positive voltage on the LAN cable while ignoring any negative voltage excursions; and
   (b) a positive voltage indicator electrically connected to said positive voltage detector, for indicating to a LAN sentinel that a positive voltage was detected on the LAN cable.

2. The apparatus of claim 1, wherein said positive voltage detector comprises comparator means for detecting whether the voltage on the LAN cable exceeds a predetermined positive level.

3. The apparatus of claim 1, wherein said positive voltage detector comprises:
   (a) a reference voltage generator which generates a reference voltage of a predetermined positive level; and
   (b) a comparator electrically connected to said reference voltage generator and to the LAN cable, which generates a first signal if the voltage level on the LAN cable exceeds said reference voltage and a second signal otherwise.

4. The apparatus of claim 3, wherein said reference voltage generator further comprises a sensitivity adjuster for varying said reference voltage sensitivity adjuster.

5. The apparatus of claim 3, wherein said positive voltage detector further comprises a pulse stretcher electrically connected to said comparator and said positive voltage indicator, which triggers said positive voltage indicator when said comparator generates said first signal.

6. An apparatus for monitoring voltage on a LAN cable on which data is conveyed by negative-going pulses, comprising:
   (a) a positive voltage detector electrically connected to the LAN cable for detecting positive voltage on the LAN cable, said positive voltage detector including peak detecting means for detecting the peak positive voltage on the LAN cable; and
   (b) a positive voltage indicator electrically connected to said positive voltage detector for indicating to a LAN sentinel the amount of voltage on the LAN cable.

7. An apparatus for monitoring voltage on a LAN cable on which data is conveyed by negative-going pulses, comprising:
   (a) a positive voltage detector electrically connected to the LAN cable, including
     (1) a resistor having a first end and a second end, said second end electrically connected to ground,
     (2) a capacitor having a first end and a second end, said first end being electrically connected to said positive voltage indicator and said second end being electrically connected to ground,
     (3) a comparator having a non-inverting input electrically connected to said LAN cable and an inverting input electrically connected to said first end of said capacitor, which generates as output a first signal when the voltage level of said non-inverting input exceeds the level of said inverting input and a second signal otherwise, and
     (4) a switch having a first terminal electrically connected to a voltage supply, a second terminal electrically connected to said first end of said capacitor and a control electrically connected to said output of said comparator, which is closed when the signal on said control is said first signal; and
   (b) a positive voltage indicator electrically connected to said positive voltage detector for indicating to a LAN sentinel the amount of voltage on the LAN cable.

8. The apparatus of claim 1, wherein said positive voltage detector comprises average detecting means for determining the average positive voltage on the LAN cable.

9. An apparatus for monitoring voltage on a LAN cable on which data is conveyed by negative-going pulses, comprising:
   (a) a positive voltage detector electrically connected to the LAN cable, said positive voltage detector including
     (1) a half wave rectifier electrically connected to the LAN cable, which generates an output signal having a positive voltage component similar to that on the LAN cable and no negative voltage component,
     (2) a resistor having a first end and a second end, said first end electrically connected to said output signal of said half wave rectifier, and
     (3) a capacitor having a first end electrically connected to said second end of said resistor and a second end electrically connected for ground; and
   (b) a positive voltage indicator electrically connected to said positive voltage detector, for indicating to a LAN sentinel the amount of voltage on the LAN cable.

10. The apparatus of claim 1, wherein said positive voltage indicator generates an audio tone to alert said LAN sentinel.

11. The apparatus of claim 1, wherein said positive voltage indicator generates a visual indication to alert said LAN sentinel.

12. The apparatus of claim 11, wherein said visual indication is a LED.

13. The apparatus of claim 1, wherein said positive voltage indicator generates an electrical indication to alert said LAN sentinel.

14. The apparatus of claim 1, further comprising a media attachment unit.

15. The apparatus of claim 1, further comprising a portable diagnostic tool.

16. The apparatus of claim 1, wherein said LAN sentinel is a data processing system electrically connected to a plurality of said positive voltage indicators.

17. A method for monitoring voltage on a LAN cable on which data is conveyed by negative-going pulses, comprising the steps of:

(1) detecting positive voltage on the LAN cable while ignoring any negative voltage excursions; and (2) indicating to a LAN sentinel the presence of positive voltage on the LAN cable.

18. The method of claim 17, wherein step (1) comprises the steps of:

(3) generating a reference voltage of a predetermined positive level;

(4) comparing said reference voltage to the voltage on the LAN cable; and (5) generating a first signal if the voltage level on the LAN cable exceeds said reference voltage and a second signal otherwise.

19. A method for monitoring voltage on a LAN cable on which data is conveyed by negative-going pulses, comprising the steps of:

(a) determining the peak positive voltage on the LAN cable; and (b) indicating to a LAN sentinel the presence of positive voltage on the LAN cable.

20. The method of claim 17, wherein step (1) comprises the step of determining the average positive voltage on the LAN cable.

* * * * *